July 4, 1961

W. BAIER ET AL 2,991,094

ARTICULATE MECHANICAL CONNECTION

Filed Jan. 13, 1959

Inventors:
Walter Baier
Hans Voigtmann
by: Michael S. Striker

United States Patent Office 2,991,094
Patented July 4, 1961

2,991,094
ARTICULATE MECHANICAL CONNECTION
Walter Baier and Hans Voigtmann, Stockdorf, near Munich, Germany, assignors to Wilhelm Baier K.G., Stockdorf, near Munich, Germany
Filed Jan. 13, 1959, Ser. No. 786,593
Claims priority, application Germany Jan. 18, 1958
3 Claims. (Cl. 287—14)

The present invention relates to mechanical connections in general, and more particularly to an improved articulate connection between two parts which permits angular movements of one part about the other part in a given plane and simultaneous linear movements of the angularly movable part toward and away from the other part in the same plane. The novel connection is particularly suitable for attaching a wind deflector to the roof frame of an automotive conveyance.

Wind deflectors are often utilized in certain automotive vehicles, especially limousines, whose roof or ceiling is formed with an opening or cutout extending rearwardly from a point close to the windshield. The wind deflector is mounted above the windshield on bearing members which enable the driver or his companion to pivot the deflector about a substantially horizontal axis so that a portion of the deflector extends upwardly through the opening and beyond the upper side of the roof. Means are provided for locking the plate-like wind deflector in such operative position in order to prevent its movements under the influence of headwind when the conveyance is in motion. The disadvantage of known devices for mounting of wind deflectors is in that their movements into operative position and the actuation of their locking means to retain the wind deflectors in such position require two separate operations. Thus, as they are usually operated by the driver, the manipulation of wind deflectors may become hazardous especially if the vehicle travels at a high rate of speed.

An important object of the present invention is to provide a mechanical connection which is particularly suitable for securing a wind deflector to the roof frame of an automotive vehicle, and which is so constructed that the wind deflector may be unlocked, moved into a different position and thereupon locked in its now position in uninterrupted and very rapid sequence, and in a single operation.

Another object of the invention is to provide a wind deflector which is so connected to the roof frame of an automotive vehicle that its movements into locked position are brought about in a fully automatic way.

A further object of the invention is to provide a mechanical connection between two parts one of which may be automatically locked in a number of angularly spaced positions with respect to the other part.

A still further object of the instant invention is to provide a mechanical connection which is particularly suitable for articulately attaching the wind deflecting plate to the roof frame of an automotive vehicle in a series of angularly spaced positions, and for releasably locking the plate in each such position.

A yet further object of the invention is to provide a wind deflector which is so connected to the roof frame of an automotive vehicle that it is automatically locked in a desired angular position as soon as it is released by the hand of the driver of his companion.

A concomitant object of the invention is to provide a very simple, compact and reliable mechanical connection for adjustably attaching the wind deflector to the apertured roof frame of an automotive vehicle which may be readily installed in different types of conveyances.

An additional object of the invention is to provide a connection for adjustably attaching the wind deflector to the roof frame of an automotive vehicle which is so constructed that it may be utilized in different types of conveyances regardless of the configuration and curvature of the roof frame.

The above and certain other objects of the invention are attained by the provision of a mechanical connection which comprises a first part and a second part connected to the first part by means oestricting it to rotation in a given plane, and means being provided for permitting movements of the second part in the aforementioned plane toward and into locking engagement with, or away from the first part. More specifically, when the novel connection is utilized for attaching a wind deflector to the roof frame of an automotive vehicle, a first part is rigidly connected to the roof frame and defines therewithin a plurality of substantially radially spaced recesses disposed in a vertical plane for reception of a locking element connected with the second part which latter is also connected to the wind deflector. The locking element preferably assumes the shape of a rod or pin rigidly connected to the second part for movements with the wind deflector about a pivot point located in the first part so that one end of the rod or pin may be aligned with each of the recesses when the rod is pivoted with the wind deflector and the second part about the aforementioned pivot point in a substantially vertical plane. The first part defines a seat or bearing for reception of a bolt which latter is slidable in the second part, is traversed by the aforementioned rod, and comprises a preferably spherical head received in the seat of the first part and restricted by the first part to movements in a single substantially vertical plane in which the axis of the rod, the pivot point and all the recesses are disposed. The bolt slidably receives the rod in such manner that the rod, together with the wind deflector and the second part, may be moved away from the first part to remove its end from a selected recess whereupon the wind deflector, the second part, the rod and the bolt may be pivoted about the latter's head into a desired new angular position in said plane. After a predetermined angular movement has been performed by the wind deflector, by the bolt, by the second part and by the rod, the latter's end may be pushed together with the wind deflector in a direction toward the first part to move the end into another recess whereby the wind deflector is locked in its new position. It is preferred to provide a resilient member for constantly urging the wind deflector and the rod in a direction toward the first part so that the end of the rod automatically enters a selected recess when the wind deflector is released. It is preferred to provide two spaced connections of the above described construction for each wind deflector and to connect the stationary first part or mounting support of each connection to the roof frame above the windshield.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Figure 1:
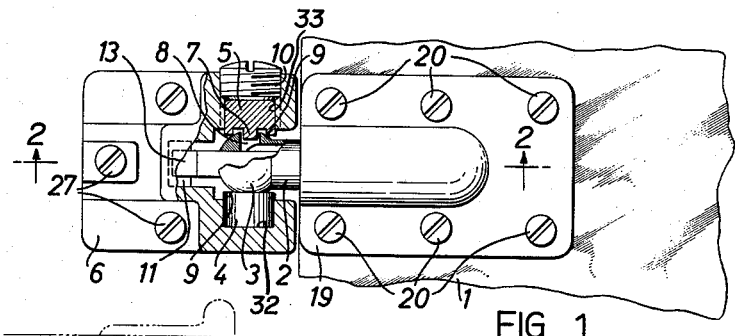
FIG. 1 is a plan view of the novel connection with certain components of the stationary first part partly broken away, and fragmentary plan view of a wind deflector which is connected to the movable second part of the device.
Figure 2:
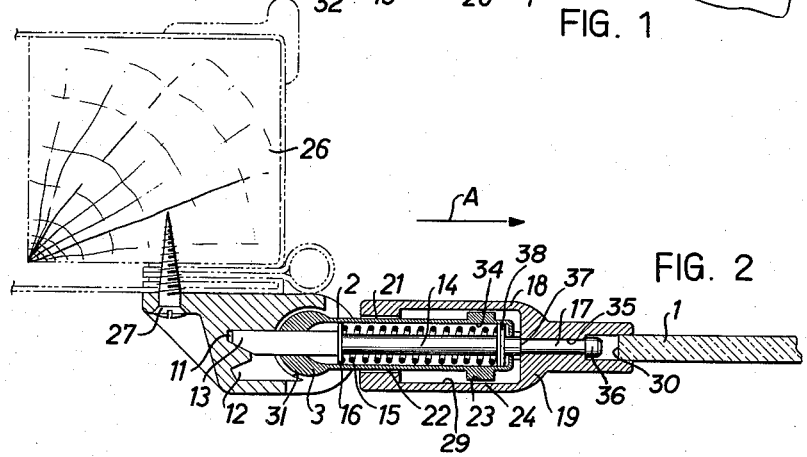
FIG. 2 is a longitudinal axial section through the connection taken on line II—II of FIG. 1, as seen in the direction of arrows.
Figure 3:
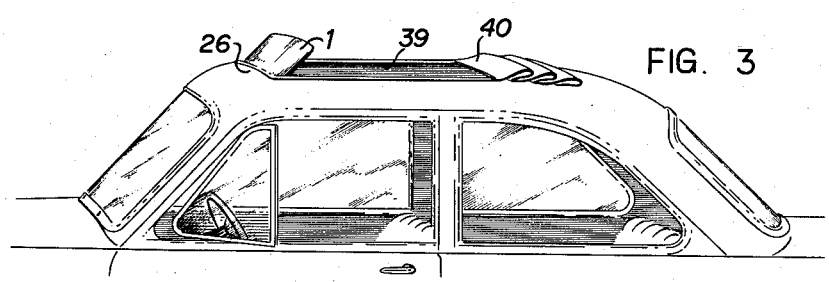
FIG. 3 shows in perspective view the roof of an automobile with the wind deflector extending through the opening in the ceiling.
Figure 4:
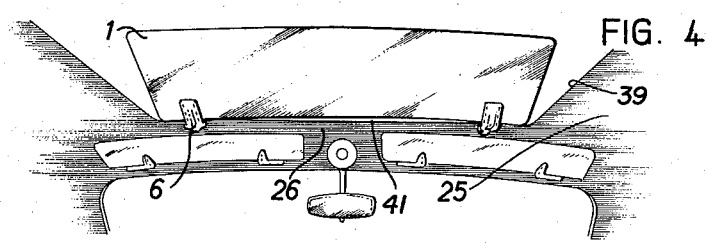
FIG. 4 is a front elevational view of the wind deflector and of two mechanical connections for affixing same to the roof frame, as seen from one of the seats in the automobile.

Referring now in greater detail to the drawings, there is shown in FIGS. 3 and 4 a wind deflector plate 1 which is connected to the roof frame portion 26 of a passenger vehicle 28 by two articulate mechanical connections one of which is illustrated in full detail in FIGS. 1 and 2. The connection comprises a stationary first part or mounting support 6 which is rigidly connected to the roof frame portion 26 by a series of suitably spaced screws 27, and a movable second part including two plates 18, 19 both rigidly connected to the opposing sides of wind deflector 1 by a series of screws 20. The two plates are disposed in mirror reverse and define therebetween a chamber 29 for reception of means which adjustably connect same to the stationary mounting support 6 and hence to the roof frame portion 26 of the conveyance 28. Chamber 29 is disposed in a suitable cutout 30 of wind deflector 1, shown in FIG. 2.

The means for connecting plates 18, 19 with the mounting support 6 comprises a ball bolt 2 which is slidable in the chamber 29 and has a free end located externally of plates 18, 19 formed into a preferably spherical head or ball 3 received in a concave seat 31 in mounting means 6. A pair of diametrically opposed bores or grooves 8 (only one shown in FIG. 1) is formed in the periphery of ball 3 the grooves having a common substantially horizontal axis perpendicularly intersecting the longitudinal axis of bolt 2. Each groove 8 receives a stud 7 (only one shown in FIG. 1) formed on and extending beyond the end faces of ball carriers or bearing elements 4 and 5. Member 4 is inserted into a blind bore 32 formed in mounting support 6, and the member 5 is received in an at least partially tapped bore 33. The common axis of bores 32, 33 and studs 7 is perpendicular to the longitudinal axis of bolt 2, and the diameters of grooves 8 are preferably larger than the diameters of studs 7 so that the latter are received with a certain amount of play in the spherical head or ball 3 of bolt 2. The end faces of bearing elements 4, 5 are in contact with convex surfaces 9 forming part of the peripheral zone of ball 3, and are pressed thereagainst with a controllable force depending upon the extent to which the externally threaded outer end 10 of bearing element 5 is screwed into the tapped bore 33. Members 4—6 and studs 7 restrict the bolt 2 to angular movements about a pivot point coinciding with the center of curvature of its head 3 in a substantially vertical plane identical with the plane in which the section of FIG. 2 is taken.

The mantle 22 of bolt 2 is slidably received in the internal collar 21 formed by plates 18, 19 at the left-hand end of chamber 29, and the bolt is also formed with an external flange 24 which is guided by the internal surfaces 23 of members 18, 19 in the chamber 29. Thus, bolt 2 is reciprocably slidable in chamber 29 in directions of its axis but cannot be withdrawn from the chamber when the plates 18, 19 are connected to wind deflector 1.

Bolt 2 and its head 3 define an axial bore 34 which reciprocably receives a locking member in the form of an elongated pin or rod 14 whose wedge-shaped left-hand end 13 is receivable in one of recesses 11, 12 in mounting support 6, and whose right-hand end portion 17 is of reduced diameter and is received in a bore 35 defined by plates 18, 19. Bore 35 is coaxial and communicates with chamber 29 and with cutout 30 in wind deflector 1. A boss 36 at the free right-hand end of reduced-diameter portion 17 of rod 14 is received in cutout 30 and, together with a shoulder 37 on the rod rigidly connects the latter to plates 18, 19 and hence to wind deflector 1 for movements in the axial direction of and with respect to bolt 2 toward and away from the mounting support 6.

When the assembly of parts 1, 14, 18 and 19 is moved in the direction of arrow A to an extent sufficient to remove the free end 13 of locking means 14 from recess 11, the bolt 2 with parts 1, 14, 18 and 19 may be pivoted about the common axis of bearing elements 4, 5 and their studs 7 in upward direction (see FIG. 2) to an extent sufficient to align the end 13 with the lower recess 12 whereupon the parts 1, 14, 18 and 19 are moved with respect to bolt 2 in a direction counter to that indicated by arrow A to move the end 13 into recess 12 and to thereby lock the bolt 2 against rotation about bearing means 4, 5.

In its preferred form, the novel connection is automatically lockable by resilient means here shown as a coil spring 15 which is received in the bore 34 of bolt 2 and operates between discoid members 38 which are slidably mounted on rod 14 and a similar discoid member 16 which latter is rigidly connected to the rod. In this manner, spring 15 constantly urges the rod 14 in a direction to left and thereby maintains the end 13 in one of recesses 11, 12. Thus, when no force in the direction of arrow A is exerted against the wind deflector 1 and hence against plates 18, 19 and rod 14, spring 15 automatically moves and thereupon maintains the rod in a position in which the rotation of head 3 in the seat 31 of mounting support 6 is prevented. Clearly, more than two recesses 11, 12 may be provided in mounting support 6, if desired. It will be noted that these recesses are arranged radially with respect to the center of curvature of ball 3 so that the end 13 of rod 14 may enter one thereof as soon as the wind deflector 1 is released.

In FIGS. 3 and 4, the wind deflector plate 1 is shown in operative position, i.e. its major portion extends through an opening or cutout 39 formed in the ceiling or roof 25 of automobile 28. The opening 39 may be closed by a foldable sliding cover 40 when the wind deflector 1 is pivoted into the interior of vehicle 28, i.e. below the level of ceiling 25.

As may be observed in FIG. 4, the wind deflector 1 is mounted on two mechanical connections of the type shown in FIGS. 1 and 2. Stationary parts 6 of both connections are so connected to the roof frame portion 26 that the common axes of their bearing elements 4, 5 are horizontal or nearly horizontal, i.e. that the wind deflector 1 is pivotable about a substantially horizontal axis. It is assumed in FIGS. 3 and 4 that the ends 13 of locking means 14 rest in the lower recesses or notches 12 of both stationary parts or mounting supports 6. As above mentioned, more than two recesses or notches 11, 12 may be provided in each mounting support 6 enabling the locking means 14 to assume a series of additional positions between and beyond those shown in FIG. 2 and FIGS. 3–4.

By utilizing bearing studs 7 whose diameters are smaller than those of bores 8 in the head 3 of ball bolt 2, the retention of bolt 2 in stationary part 6 is actually brought about by the end faces of bearing elements 4 and 5 which are in contact with arcuate surface portions 9 of ball 3. This arrangement allows for certain lateral adjustments in the position of bolt 2 merely by slightly unscrewing the bearing element 5, which is important as it allows for the mounting of wind deflector 1 on roof frame portions 26 of different curvatures. In other words, studs 7 merely prevent the head 3 from jumping out of its seat 31 whereas the actual retention of the head is performed by the end faces of bearing elements 4 and 5. Accordingly, movable second parts or plates 18, 19 of the two mechanical connections shown in FIG. 4 need not be parallel or coplanar with each other as the mounting of heads 3 in stationary parts 6 allows for slight deformation of wind deflector 1 as indicated by the latter's arcuate lower edge 41.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A mechanical connection comprising, in combination: a first part defining a seat and having a plurality of recesses substantially radially arranged with respect to said seat; a second part; an elongated bolt having a longitudinal axis and a head received in said seat and a bore extending therethrough and through said head, said bolt being slidably connected to the second part for guiding the latter in direction of said bolt axis toward and away from the first part; bearing means connected to the first part for restricting said head, said bolt and the second part to angular movements with respect to the first part about an axis extending transverse to said bolt axis; and locking means comprising an elongated rod fixed to the second part, slidably received in the bore of said bolt, and having an end extendable through said head and receivable in one of said recesses for preventing angular movements of said bolt and of the second part with respect to the first part when the second part and said locking means are moved with respect to said bolt in a direction toward the first part, said end being removable from the respective recess when the second part and said locking means are moved with respect to said bolt in a direction away from the first part.

2. A mechanical connection comprising, in combination: a first part defining a seat and having a plurality of recesses substantially radially arranged with respect to said seat; a second part; an elongated bolt having a longitudinal axis and a head received in said seat and a bore extending therethrough and through said head, said bolt being slidably connected to the second part for guiding the latter in direction of said bolt axis toward and away from the first part, bearing means connected to the first part for restricting said head, said bolt and the second part to angular movements with respect to the first part about an axis extending transverse to said bolt axis; locking means comprising an elongated rod fixed to the second part, slidably received in the bore of said bolt, and having an end extendable through said head and receivable in one of said recesses for preventing angular movements of said bolt and of the second part with respect to the first part when the second part and said locking means are moved with respect to said bolt in a direction toward the first part, said end being removable from the respective recess when the second part and said locking means are moved with respect to said bolt in a direction away from the first part; and resilient means in said bore operatively connected with said locking means and with said bolt for constantly urging the locking means and the second part in a direction toward the first part whereby the end of said locking means automatically enters into one of said recesses to prevent pivotal movements of said bolt, of said locking means and of the second part with respect to the first part.

3. A mechanical connection comprising, in combination: a mounting support defining a concave seat and having a plurality of recesses substantially radially arranged with respect to said seat; a pair of interconnected plates defining therebetween an elongated chamber; an elongated bolt having an axis, a head on one end of said bolt and received in said seat, and an axial bore extending therethrough and through said head, said bolt being slidably received in said chamber whereby said plates are movable in the axial directions of said bolt toward and away from said support; means for retaining said bolt in said chamber; bearing means engaging said head and connected with said mounting support for restricting said head, said bolt and said plates to angular movements about an axis substantially at right angles to the axis of said bolt; an elongated rod having one end connected to said plates, slidably received in said bore, and having another end receivable in one of said recesses when the plates and said rod are moved in a direction toward said support to lock said plates and said bolt against pivotal movements with respect to said support, and said last mentioned end of said rod being withdrawn from the respective recess when said plates and said rod are moved along said bolt in a direction away from said support; and resilient means operatively connected to said rod and to said bolt for constantly urging the rod and said plates in a direction toward said support whereby the last mentioned end of said rod automatically enters a selected recess in said support to lock the plates and the bolt against angular movements about said bearing means.

References Cited in the file of this patent

UNITED STATES PATENTS

| 1,781,545 | Groenenstein | Nov. 11, 1930 |
| 1,784,108 | Pearson | Dec. 9, 1930 |

FOREIGN PATENTS

| 151,236 | Switzerland | Mar. 1, 1932 |
| 747,081 | Great Britain | Mar. 28, 1936 |